(12) United States Patent
Vargas Bautista et al.

(10) Patent No.: US 9,155,013 B2
(45) Date of Patent: Oct. 6, 2015

(54) CELL RANGE EXPANSION ELASTICITY CONTROL

(71) Applicant: QUALCOMM Incorporated, San Diego, CA (US)

(72) Inventors: Jose Edson Vargas Bautista, San Diego, CA (US); Yenamandra Sanyasi Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 13/741,153

(22) Filed: Jan. 14, 2013

(65) Prior Publication Data

US 2014/0198659 A1  Jul. 17, 2014

(51) Int. Cl.
*H04W 28/08* (2009.01)
*H04W 36/22* (2009.01)
*H04W 84/04* (2009.01)
*H04W 24/02* (2009.01)
*H04W 36/04* (2009.01)

(52) U.S. Cl.
CPC .............. *H04W 36/22* (2013.01); *H04W 28/08* (2013.01); *H04W 24/02* (2013.01); *H04W 36/04* (2013.01); *H04W 84/045* (2013.01)

(58) Field of Classification Search
CPC ............................ H04W 28/08; H04W 84/045
See application file for complete search history.

(56) References Cited

U.S. PATENT DOCUMENTS

| | | |
|---|---|---|
| 2010/0240373 A1 | 9/2010 | Ji et al. |
| 2011/0256880 A1 | 10/2011 | Golaup et al. |
| 2012/0039226 A1 | 2/2012 | Yang et al. |
| 2012/0188884 A1 | 7/2012 | Simonsson et al. |
| 2012/0225680 A1 | 9/2012 | Suh |
| 2012/0311099 A1* | 12/2012 | Yoshida ......................... 709/219 |
| 2013/0217407 A1* | 8/2013 | Gerlach et al. ................ 455/453 |

OTHER PUBLICATIONS

3GPP TS 36.300 v11.0.0 (Dec. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Dec. 2011, 194 pages.*

Lee, Study of Load Balance in 3GPP Femto-cell Network, Feb. 13-16, 2011, Advaned Communication Technology (ICACT), 2011 13th International Conference on, 4 pages.*

(Continued)

*Primary Examiner* — Hoon J Chung
(74) *Attorney, Agent, or Firm* — Norton Rose Fulbright US LLP

(57) ABSTRACT

In some aspects, a method for carrying out load balancing between cells in a heterogeneous network includes measuring loads within macro clusters in the network. The method additionally includes identifying one or more macro clusters experiencing unbalanced load conditions, and sending balancing indicators to one or more cells in the identified macro cluster(s). In other aspects, a method for carrying out load balancing in a heterogeneous network includes reporting cell loads within a macro cluster, and monitoring for balancing indicators. The method further includes responding to a balancing indicator by iteratively adjusting a value of an individual cell offset for a cell until one or more conditions is satisfied. Example conditions include accomplishment of handover, to or from the cell, of one or more low mobility User Equipment (UE), and making a determination that the value of the individual cell offset has reached a threshold prohibiting further adjustment.

14 Claims, 11 Drawing Sheets

(56) References Cited

OTHER PUBLICATIONS

3GPP Draft; S5-120709 NGMN_Top_OPE_Recommendations_1.0, 3rd Generation Partnership Project (3GPP), Mobile Competence Centre; 650, Route Des Lucioles; F-06921 Sophia-Antipolis Cedex; France, Mar. 27, 2012, pp. 1-43, XP050647029, [retrieved on Mar. 27, 2012] p. 19, paragraph 4.6-p. 21, paragraph 4.6.3.2.

4G Americas: "Self-Optimizing Networks: Benefits of SON in LTE", Jul. 25, 2011, pp. 1-69, XP055083688, Retrieved from the Internet: URL: http://www.4gamericas.org/documents/Self-Optimizing Networks-Benefits of SON in LTE-Jul. 2011.pdf [retrieved on Oct. 11, 2013] p. 20, paragraph 3.5-p. 24, paragraph 3.6.

International Search Report and Written Opinion—PCT/US2013/076146—ISA/EPO—Jun. 17, 2014.

Laselva D., et al., "Self-Optimisation" In: "LTE Self-Organising Networks (SON)", Dec. 9, 2011, John Wiley & Sons, Ltd, Chichester, UK, XP055091508, ISBN: 978-1-11-997067-5 pp. 135-234, DOI: 10.1002/9781119961789.ch5, p. 157, paragraph 5.2-p. 193, paragraph 5.3.

\* cited by examiner

CELL RANGE EXPANSION ELASTICITY CONTROL

BACKGROUND

1. Field

Aspects of the present disclosure relate generally to wireless communication systems, and more particularly, to cell range expansion elasticity control.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

A Heterogeneous Network (HetNet) is a network having complex interoperation between macrocell, small cell (e.g., pico cell, femtocell), and in some cases WIFI™ network elements used together to provide a mosaic of coverage, with handoff capability between network elements. A Cell Individual Offset (CIO) is an offset that is applied by a UE to the measurement results of a Primary Reference Signal of a neighbor cell, before the UE evaluates if an event has occurred, such as whether the UE has entered range of a pico cell sufficient to handover to the pico cell. Assuming hysteresis and other deployment offsets constant, if one wants a certain neighbor relation to seem more attractive, then a positive individual offset towards that neighbor cell shall be introduced. Prior HetNet proposals provided for fixed CIO for fixed and varying time/frequency resource partitioning configurations.

SUMMARY

Techniques for performing cell range expansion elasticity control for traffic load balancing in co-channel heterogeneous networks are described herein. In part, these techniques employ a load balancing entity or Self-Optimizing Network (SON) functionality that measures loads within macro clusters in the heterogeneous network based on load reports from macro cells and/or pico cells within the macro clusters. Based on the measured loads, the load balancing entity identifies which of the macro clusters are experience a load imbalance and generates balancing indicators to trigger attempts, by overloaded cells of the macro clusters, to handover low mobility UEs to target cells. Depending on need, the load balancing entity may shift the low mobility UEs from one specific cell to another and may specify load shifting between macro cells, between pico cells, and between macro cells and pico cells. Additionally, these techniques employ cells that report loads to the load balancing entity, and that monitor for balancing indicators from the load balancing entity. Upon receiving balancing indicators, the cells can iteratively adjust values of individual cell offsets and configure reports for affiliated UEs to report target cell based on radio signal receive power of the target cells as adjusted by the individual cell offsets. The iterative adjustment may continue until handover of affiliated UEs to the target cells can be accomplished, or until the values of the cell individual offsets have reached or exceeded a threshold prohibiting further adjustment.

In some aspects, a method for carrying out load balancing between cells in a heterogeneous network includes measuring loads within macro clusters in the heterogeneous network. The method additionally includes identifying one or more macro clusters experiencing unbalanced load conditions. The method further includes sending balancing indicators to one or more cells in the one or more macro clusters.

In other aspects, a method for carrying out load balancing in a heterogeneous network includes reporting cell loads within a macro cluster. The method additionally includes monitoring for one or more balancing indicators. The method further includes responding to a balancing indicator by iteratively adjusting a value of an individual cell offset for a cell until one or more conditions is satisfied. Example conditions include accomplishment of handover, to or from the cell, of one or more low mobility User Equipment (UE). Example conditions also include making a determination that the value of the individual cell offset has reached a threshold prohibiting further adjustment.

In additional aspects, an apparatus for carrying out load balancing between cells in a heterogeneous network includes means for measuring loads within macro clusters in the heterogeneous network. The apparatus additionally includes means for identifying one or more macro clusters experiencing unbalanced load conditions. The apparatus further includes means for sending balancing indicators to one or more cells in a macro cluster.

In further aspects, an apparatus for carrying out load balancing in a heterogeneous network includes means for reporting cell loads within a macro cluster. The apparatus additionally includes means for monitoring for one or more balancing indicators. The apparatus further includes means for responding to a balancing indicator by iteratively adjusting a value of an individual cell offset for a cell until one or more conditions is satisfied. Example conditions include accomplishment of handover, to or from the cell, of one or more low mobility User Equipment (UE). Example conditions also include making of a determination that the value of the individual cell offset has reached a threshold prohibiting further adjustment.

In still other aspects, a computer program product includes a non-transitory computer-readable medium having code for measuring loads within macro clusters in the heterogeneous network. The non-transitory computer-readable medium additionally has code for identifying one or more macro clusters experiencing unbalanced load conditions. The non-transitory computer-readable medium further has code for sending balancing indicators to one or more cells in a macro cluster.

In still additional aspects, a computer program product includes a non-transitory computer-readable medium having code for reporting cell loads within a macro cluster. The non-transitory computer-readable medium additionally has code for monitoring for one or more balancing indicators. The non-transitory computer-readable medium further has code for responding to a balancing indicator by iteratively adjusting a value of an individual cell offset for a cell until one or more conditions is satisfied. Example conditions include accomplishment of handover, to or from the cell, of one or more low mobility User Equipment (UE). Example conditions also include making a determination that the value of the individual cell offset has reached a threshold prohibiting further adjustment.

In still further aspects, a network component of a heterogeneous network includes one or more processors and a memory coupled to the one or more processors. The one or more processors are configured to measure loads within a plurality of macro clusters in the heterogeneous network. The one or more processors are additionally configured to identify one or more macro clusters experiencing unbalanced load conditions. The one or more processors are further configured to send balancing indicators to one or more cells in a macro cluster.

In yet other aspects, a network component of a heterogeneous network, includes one or more processors and a memory coupled to the one or more processors. The one or more processors are configured to report cell loads within a macro cluster. The one or more processors are additionally configured to monitor for one or more balancing indicators. The one or more processors are further configured to respond to a balancing indicator by iteratively adjusting a value of an individual cell offset for a cell until one or more conditions is satisfied. Example conditions include accomplishment of handover, to or from the cell, of one or more low mobility User Equipment (UE). Example conditions also include making a determination that the value of the individual cell offset has reached at least one threshold prohibiting further adjustment.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
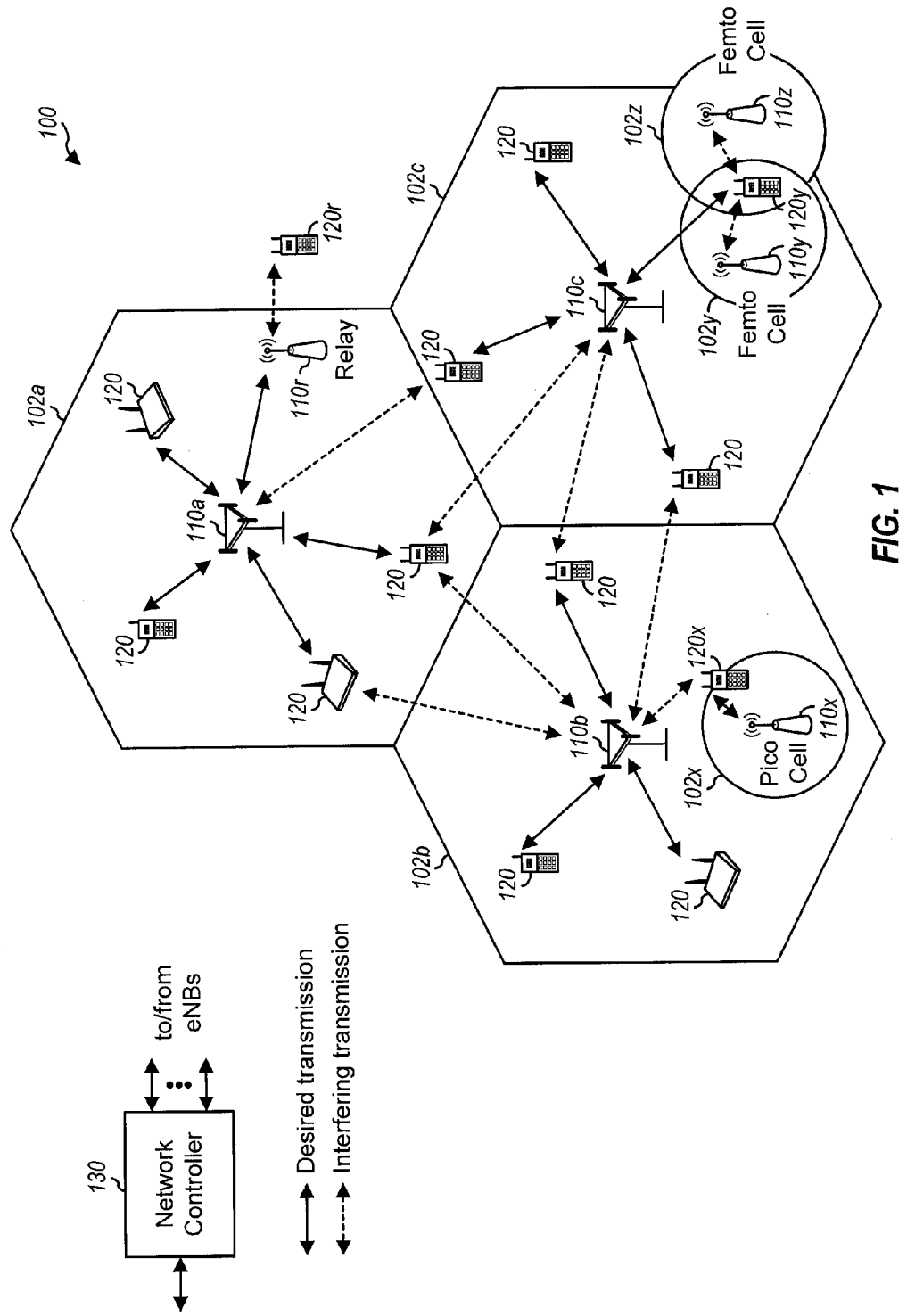
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
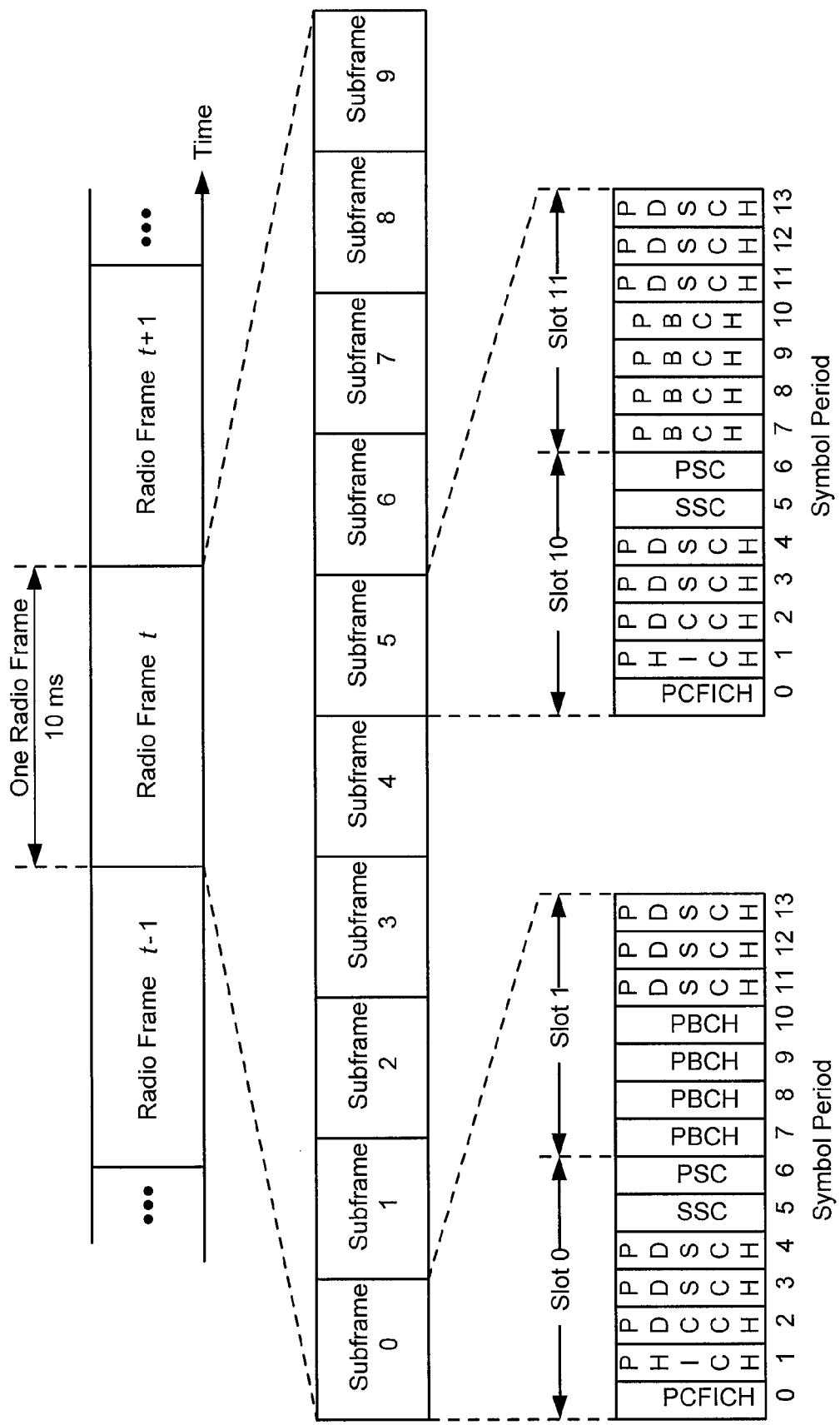
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
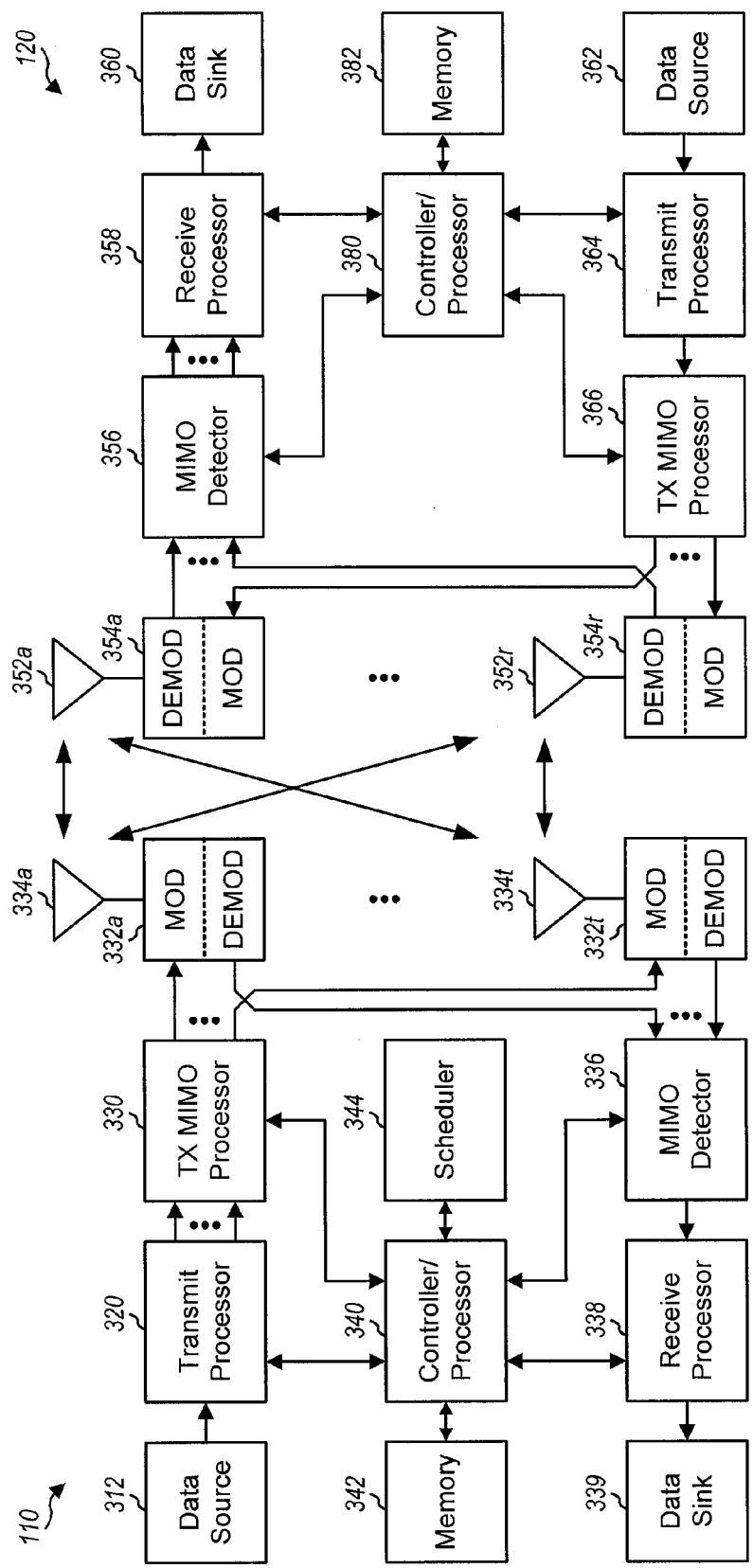
FIG. 3 is a block diagram conceptually illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNodeB 110. At the eNodeB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 4-8, and/or other processes for the techniques described herein. The memories 342 and 382 may store data and program codes for the eNodeB 110 and the UE 120, respectively. A scheduler 344 may schedule UEs for data transmission on the downlink and/or uplink.

In one configuration, the UE 120 for wireless communication includes means for detecting interference from an interfering eNodeB during a connection mode of the UE, means for selecting a yielded resource of the interfering eNodeB, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
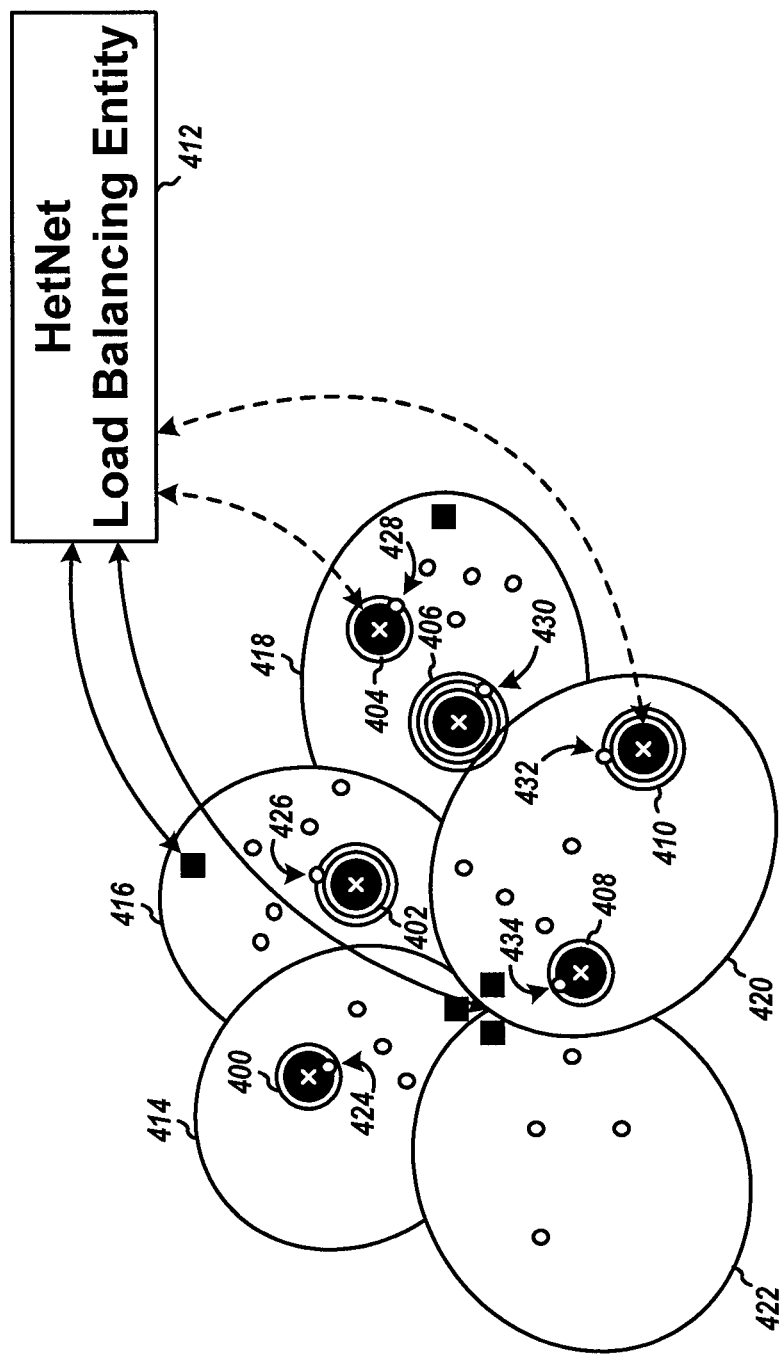
FIG. 4 is a block diagram conceptually illustrating an arrangement of macro cell clusters having a load balancing entity in accordance with the present disclosure.

FIG. 4 shows an example network implementing Cell Range Expansion (CRE) elasticity control through adaptive Cell Individual Offset (CIO) as a mechanism for macro-pico, pico-macro, macro-macro, and/or pico-pico cell traffic load balancing in co-channel Heterogeneous Networks (HetNets). As mentioned above, CIO is an offset applied in HO reporting to allow a UE to operate on a pico cell, even though it finds the received signal strength from the pico cell to be lower than that of a macro cell. UEs, in this case, often use special interference cancellation mechanisms to select and maintain the data connection with these low power pico cells. In this manner, more UEs in the vicinity of the pico cell may operate with the pico cell, thus enabling macro cell offload in the heterogeneous network. Larger and larger CIO values may result in higher percentages of traffic offload from the macro cell to the pico cell. However, this pico cell range expansion is limited by the performance of the implemented interference cancellation mechanism at the UE.

The adaptive proposed mechanism adjusts the CIO value individually for each pico cell 400-410 via a HetNet load balancing entity 412, or via a Self-Optimizing Network (SON) function, that monitors the individual traffic load of each macro cell 414-422 and pico cell 400-410 for low mobility UEs 424-434 and changes the pico cell's and/or neighboring macro cell's CIO value locally to bring its load in incremental steps of a few dB over a range.

The effective impact of the CIO value changes or adaption is to shift cell boundaries for purposes of serving more or fewer numbers of UEs, and hence potentially balance load across cells. For example, by changing the CIO in a macro-macro cell load balancing scenario, the effective boundary between the macro cells shifts from the under-loaded cell to the overloaded cell. This change shifts UEs' service preferences from the overloaded cell to the under-loaded cell. Alternatively, by changing the CIO value in a pico-macro or macro-pico load balancing scenario, the cell range of the pico may grow and shrink around the pico base station, effectively shifting UE connection preferences between the macro and pico cell.

The load balancing entity 412 (e.g., central or SON) observes macro clusters that are composed of macro cells, pico cells in proximity to the macro cells, and UEs in proximity to either the macro cells or the pico-cells of the macro cell. The load balancing entity measures the load within various macro clusters and sets macro-to-pico indicators, pico-to-macro indicators, macro-to-macro indicators, and pico-to-pico indicators according to need. It is envisioned that the load balancing entity may be a central load balancing entity, such as the network controller 130 (see FIG. 1). Additionally, it is envisioned that the central HetNet load balancing entity may: be physically located in a macro cell, be co-located in the Mobility Management Entity (MME); be part of the MME, or may be any other entity within a SON server. Alternatively, it is envisioned that the load balancing entity may be distributed throughout a SON, and implemented by various eNBs, UEs, and/or other network components on a static or dynamic basis.

The load balancing entity preferentially performs load balancing between macro and pico cells under this macro cluster before attempting to set macro-to-macro and/or pico-to-pico load balancing indicators. For each macro cluster, the macro cell load is first compared to that of the pico cell in the cluster having the lowest load. If the load of the macro cell is significantly greater than or less than the load of the pico cell, then a macro-to-pico indicator or pico-to-macro indicator may be set, respectively. A check can be made whether offloading to or from a pico cell has been recently attempted, and a next lowest or highest load pico cell selected that has not been the target or source of offloading.

Macro cells 414-422 report macro loads and pico cells 400-410 report pico loads to the load balancing entity. Macro cells 414-422 monitor for balancing indicators that identify pico cells 400-410 or neighboring macro cells 414-422. Macro cells 414-422 respond to offloading indicators that identify pico cells 400-410 or neighboring macro cells 414-422 by iteratively adjusting a CIO for the pico cell or neighboring macro cell until either handover (e.g., to or from the pico cell 400-410 or to the neighboring macro cell 414-422) of a low mobility UE 424-434 (e.g., served by the macro or pico cell) can be accomplished, or until a determination is made that the CIO has reached at least one threshold prohibiting further adjustment. Pico-to-pico load balancing, whenever possible, may be accomplished with a similar mechanism as the one described for macro-macro load balancing.

Figure 5:
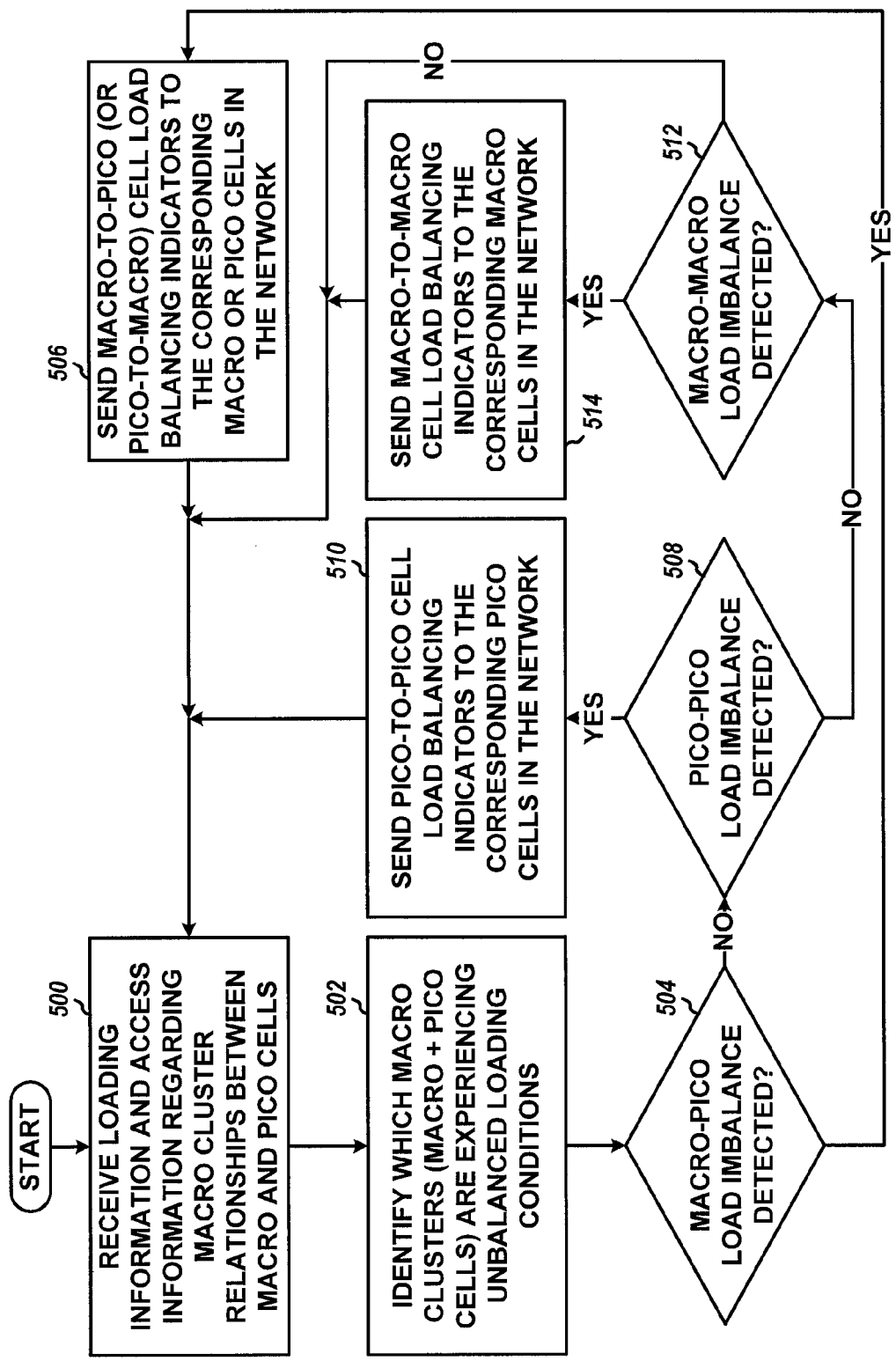
FIG. 5 is a functional block diagram conceptually illustrating example blocks executed by a central HetNet load balancing entity to implement one aspect of the disclosure.

FIG. 5 illustrates an example process carried out by a load balancing entity in accordance with the present disclosure may begin, at block 500, by receiving loading information and accessing information regarding macro cluster relationships between macro and pico cells. The loading information received at block 500 may include resource block utilization, subframe utilization, and/or number of Radio Resource Control (RRC) connections for each macro cell and pico cell in the network, or a portion of the network assigned to the load balancing entity. Processing may proceed from block 500 to block 502.

At block 502, the process may include using the loading information to identify which macro clusters are experiencing unbalanced loading conditions. Identifying which macro clusters are experiencing unbalanced loading conditions may include comparing the loads of macro clusters to one another, and evaluating the results of those comparisons to determine whether they exceed one or more thresholds. Additionally, identifying which macro clusters are experiencing unbalanced loading conditions may include comparing the loads of pico cells to a load of a macro cluster in which the pico cells reside, and evaluating the results of those comparisons to determine whether they exceed one or more thresholds. Further, identifying which macro clusters are experiencing unbalanced loading conditions may include comparing the loads of pico cells residing in a macro cluster to one another, and evaluating the results of those comparisons to determine whether they exceed one or more thresholds. Alternatively or additionally, identifying which macro clusters are experiencing unbalanced loading conditions may be carried out in the manner described below with respect to FIG. 6. Processing may proceed to block 504 from block 502.

At block 504, a determination is made whether a macro-pico load imbalance is detected. This determination may be based on the comparison, at block 502, of load information received, at block 500, from the macro cluster in which the pico cells reside. If an imbalance is detected at block 502, then processing proceeds to block 506. Otherwise, processing proceeds to block 508.

At block 506, macro-to-pico or pico-to-macro load balancing indicators may be sent to the corresponding macro cells and/or pico cells in the network. These load indicators identify a source cell and a target cell, and are intended to trigger a load balancing operation whereby an attempt is made to handover one or more UEs from the source cell to the target cell. Processing may return from block 506 to block 500.

At block 508, a determination may be made whether a macro-macro load imbalance is detected. This determination may be based on the comparison, at block 502, of load information received, at block 500, from neighboring macro clusters. Responsive to a determination, at block 508, that a macro-macro load imbalance is detected, processing may proceed to block 510. Otherwise, processing may proceed to block 512.

At block 510, macro-to-macro load balancing indicators may be sent to the corresponding macro cells in the network. These load indicators identify a source cell and a target cell, and are intended to trigger a load balancing operation whereby an attempt is made to handover one or more UEs from the source cell to the target cell. Processing may return from block 510 to block 500.

At block 512, a determination may be made whether a pico-pico load imbalance is detected. This determination may be based on the comparison, at block 502, of load information received, at block 500, from the macro cluster in which the pico cells reside. Responsive to the determination, at block 512, that a pico-pico load imbalance is detected, processing may proceed to block 514. Otherwise, processing may return to block 500.

At block 514, pico-to-pico load balancing indicators may be sent to the corresponding pico cells in the network. These load indicators identify a source cell and a target cell, and are intended to trigger a load balancing operation whereby an attempt is made to handover one or more UEs from the source cell to the target cell. Processing may return to block 500 from block 514.

Figure 6:
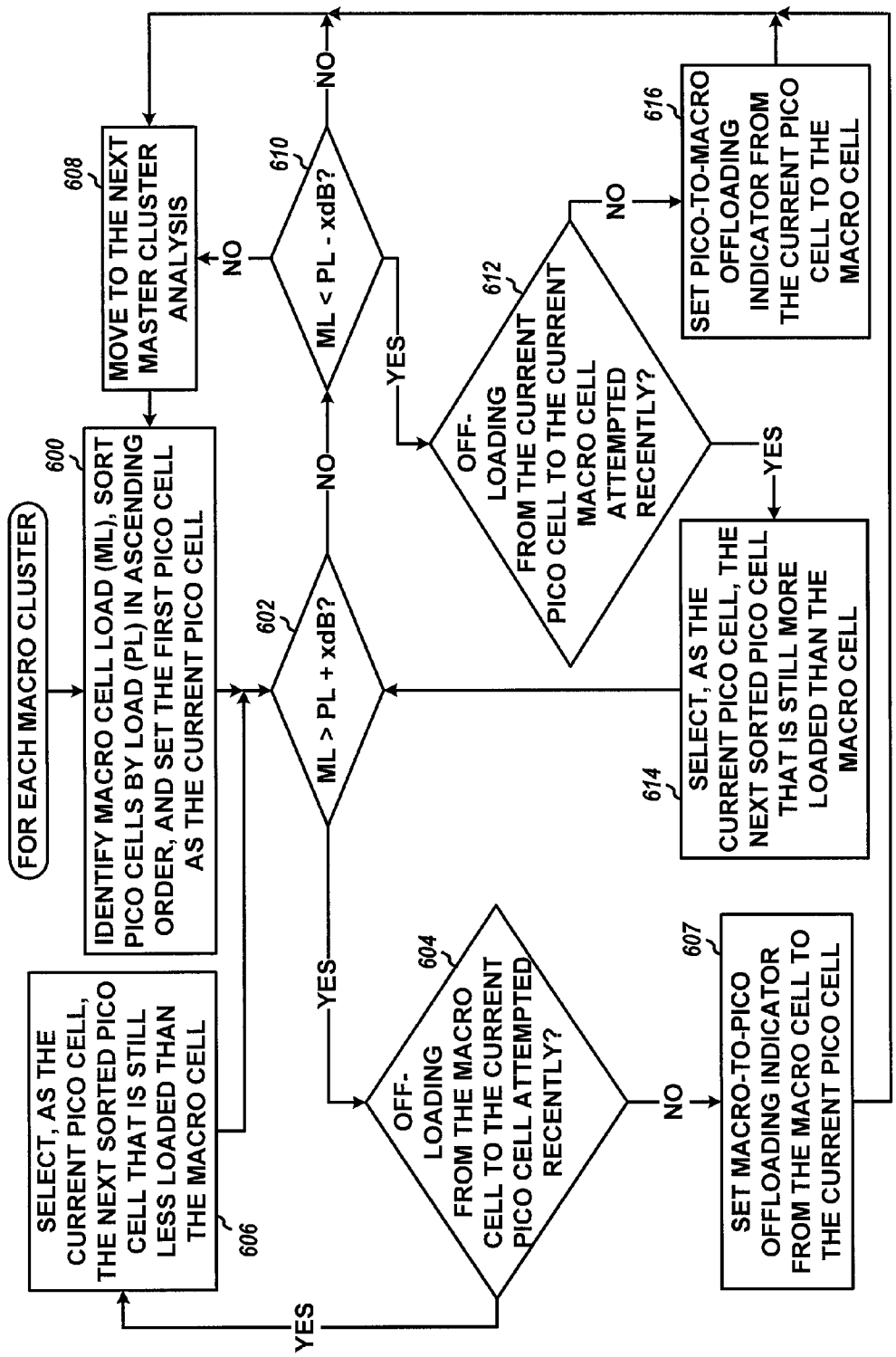
FIG. 6 is a functional block diagram conceptually illustrating example blocks executed by a macro-to-pico and pico-to-macro load balancing entity to implement one aspect of the disclosure.

Turning to FIG. 6, an example process of identifying which macro clusters are experiencing unbalanced loading conditions may be carried out by the load balancing entity by beginning, at block 600, by identifying macro cell load (ML), sorting pico cells by pico cell load (PL) in ascending order, and setting a first pico cell of the sorted pico cells as a current pico cell. Processing may proceed to block 602 from block 600.

At block 602, a determination may be made whether the macro cell load (ML) exceeds the pico cell load (PL) after upward adjustment of the pico cell load by a pico CIO (xdB) according to:

$$ML > PL + xdB \quad (1)$$

If the returned result of this evaluation is true, then processing proceeds to block 604. Otherwise, processing proceeds to block 610. One skilled in the art will readily recognize equivalent evaluative procedures, such replacing the upward adjustment of the pico cell load with a downward adjustment of the macro cell load.

Another determination may be made, at block 604, whether off-loading from the macro cell to the current pico cell has been attempted recently, such as within a predetermined time window. In response to the determination, at block 604, that offloading to the current pico cell was not recently attempted, processing proceeds to block 607. It is not desirable to repeatedly trigger attempts to handoff to the same cell. Therefore, in response to the determination, at block 604, that offloading to the current pico cell was recently attempted, processing proceeds to block 606.

At block 606, a next sorted pico cell that is still less loaded than the macro cell may be selected as the current pico cell. This selection procedure preferentially selects the next least loaded pico cell as the target for the next handover attempt. Processing returns from block 606 to block 602.

At block 607, a macro-to-pico offloading indicator may be set to indicate that offloading from the macro cell to the current pico cell should be attempted. This load indicator identifies the macro cell as the source cell and the pico cell as the target cell, and is intended to trigger a load balancing operation whereby an attempt is made to handover one or more UEs from the macro cell to the pico cell. Processing proceeds from block 607 to block 608.

At block 608, processing may move to a next macro cluster. Processing may return to block 600 from block 608. However, if all macro clusters have been evaluated, then all load indicators may be placed into a transmit queue for transmission to the macro clusters corresponding to the source and target cells of the respective load indicators.

At block 610, another determination may be made whether the macro cell load, ML, is less than the pico cell load, PL, for the current pico cell after downward adjustment thereof by the pico CIO (xdB) according to:

$$ML < PL - xdB \quad (2)$$

If the returned result of the evaluation at block 610 is true, then processing proceeds to block 612. Otherwise, processing returns to block 608. One skilled in the art will readily recognize equivalent evaluative procedures, such replacing the downward adjustment of the pico cell load with an upward adjustment of the macro cell load.

At block 612, another determination may be made whether off-loading from the current pico cell to the macro cell has been attempted recently, such as within a predetermined time window. In response to a determination, at block 612, that offloading from the current pico cell to the current macro cell not recently attempted, then processing proceeds to block 616. Otherwise, it is not desirable to repeatedly trigger attempts to handoff to the same cell. Therefore, in response to a determination, at block 612, that offloading from the current pico cell to the current macro cell was recently attempted, processing proceeds to block 614.

At block 614, a next sorted pico cell that is still more loaded than the macro cell may be selected as the current pico cell. This selection procedure preferentially selects the next most loaded pico cell as the target for the next handover attempt. Processing returns from block 614 to block 602.

At block 616, a pico-to-macro offloading indicator may be set to indicate that offloading from the current pico cell to the macro cell should be attempted. This load indicator identifies the current pico cell as the source cell and the macro cell as the target cell, and is intended to trigger a load balancing operation whereby an attempt is made to handover one or more UEs from the current pico cell to the macro cell. Processing may return from block 616 to block 608.

Figure 7:
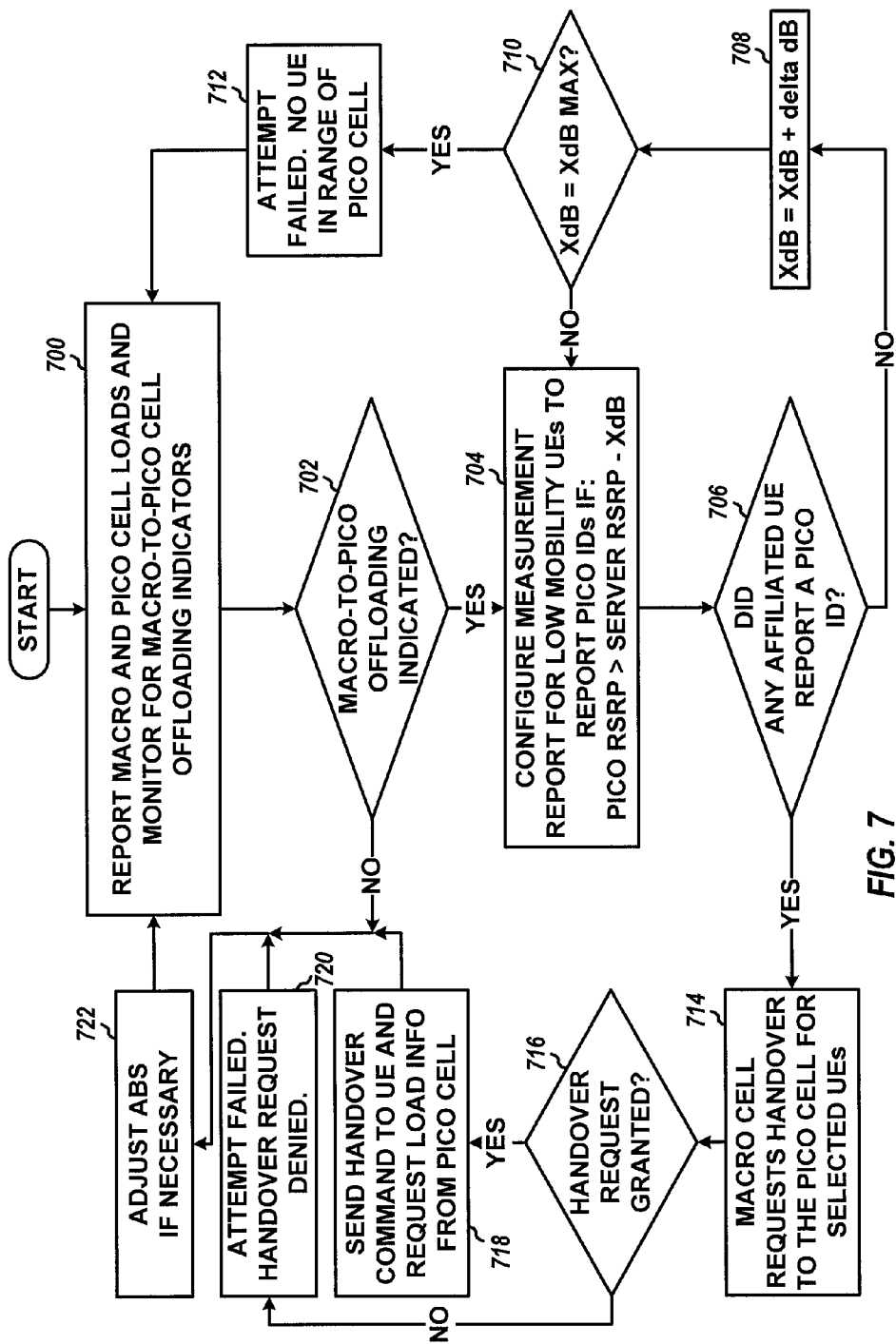
FIG. 7 is a functional block diagram conceptually illustrating example blocks executed by a macro-to-pico offloading algorithm at the macro cells to implement one aspect of the disclosure.

Turning now to FIG. 7, an example process carried out by a macro cell in accordance with the present disclosure may begin, at block 700, by reporting, to the load balancing entity, macro and/or pico cell loads, such as resource block utilization, subframe utilization, and/or number of Radio Resource Control (RRC) connections for the macro cell and each pico cell in the macro cluster. It is envisioned that macro cells may be used as a hub to capture pico cell loading and report both macro and pico cell loads to the central HetNet load balancing entity. Block 700 may also include monitoring for macro-to-pico cell offload indicators sent by the load balancing entity.

At block 702, a determination may be made whether macro-to-pico load balancing is indicated, such as by receipt of a macro-to-pico load balancing indicator that identifies a pico cell in the macro cluster. In response to a determination, at block 702, that macro-to-pico load balancing is indicated, processing may proceed to block 704. Otherwise, processing may proceed to block 722.

At block 704, measurement reports may be configured for low mobility UEs to report a pico identity (ID) if pico radio signal receive power (RSRP) exceeds server RSRP after downward adjustment of the server RSRP by a pico CIO (XdB) according to:

$$\text{Pico RSRP} > \text{Server RSRP} - XdB \quad (3)$$

Processing proceeds from block 704 to block 706. One skilled in the art will readily recognize equivalent evaluative procedures, such as replacing the downward adjustment of the server RSRP with an upward adjustment of the pico RSRP, or evaluating a result of a comparison of the server and pico RSRPs with respect to the XdB threshold.

At block 706, a determination may be made whether any UEs reported a Pico ID. It should be understood that UEs that report the Pico ID are in range of the pico cell, while those that are out of range of the pico cell will not report the Pico ID. In response to a determination, at block 706, that no UE reported a pico ID, processing may proceed to block 708. Otherwise, processing may proceed to block 714.

At block 708, the pico CIO, XdB, may be upwardly adjusted by an incremental amount (delta dB) according to:

$$XdB=XdB+\text{delta dB} \qquad (4)$$

Increasing the pico CIO in this fashion effects incremental expansion of the pico cell range. Processing proceeds from block 708 to block 710.

At block 710, a determination may be made whether the pico CIO, XdB, equals a maximum value for the pico CIO (XdB MAX) according to:

$$XdB=XdB\ MAX \qquad (5)$$

If the returned result of the valuation at block 710 is true, then processing may proceed to block 712. Otherwise, processing may return to block 704. One skilled in the art will readily recognize equivalent evaluative procedures, such as determining whether the pico CIO exceeds a threshold.

At block 712, a notification may be sent to the load balancing entity, that the attempt failed due to no UE being in range of the pico cell. This notification allows the load balancing entity to distinguish between a failure due to failed handover versus no UE being in range of the pico cell. The reported failure also enables the load balancing entity to avoid repeatedly attempting to handover to the same pico cell. Processing may return, from block 712, to another point in the process, such as block 700.

At block 714, the macro cell may request handover, to the pico cell, of one or more UEs selected from among the UEs reporting the pico cell ID. This selection may occur randomly, or it may preferentially target a UE, among the UEs reporting the pico cell ID, exhibiting a highest traffic load. Processing may proceed from block 714 to block 716.

At block 716, a determination may be made whether the handover request was granted. This determination may include receiving a message in response to the handover request. In response to a determination, at block 716, that a handover request was granted, processing may proceed to block 718. Otherwise, processing may proceed to block 720.

At block 718, the macro cell may send a handover command to the UE and request load information from the pico cell. The macro cell may additionally report successful handover to the load balancing entity. Such reporting may enable the load balancing entity to more quickly proceed with further load balancing in the macro cluster. Processing may proceed from block 718 to block 722.

At block 720, the macro cell may send a notification, to the load balancing entity, that the attempt failed due to handover request denial. This notification allows the load balancing entity to distinguish between a failure due to failed handover versus no UE being in range of the pico cell. The reported failure also enables the load balancing entity to avoid repeatedly attempting to handover to the same pico cell. Processing may proceed from block 720 to block 722.

At block 722, almost blank subframes (ABS) may be adjusted, if necessary. The ABS adjustment is a load balancing technique that may be used as a supplement to the load balancing techniques of the present disclosure. One skilled in the art will readily recognize and understand how to determine whether ABS adjustment is necessary, and how to adjust the ABS. Processing may return, from block 722, to a previous point in the process, such as block 700.

Figure 8:
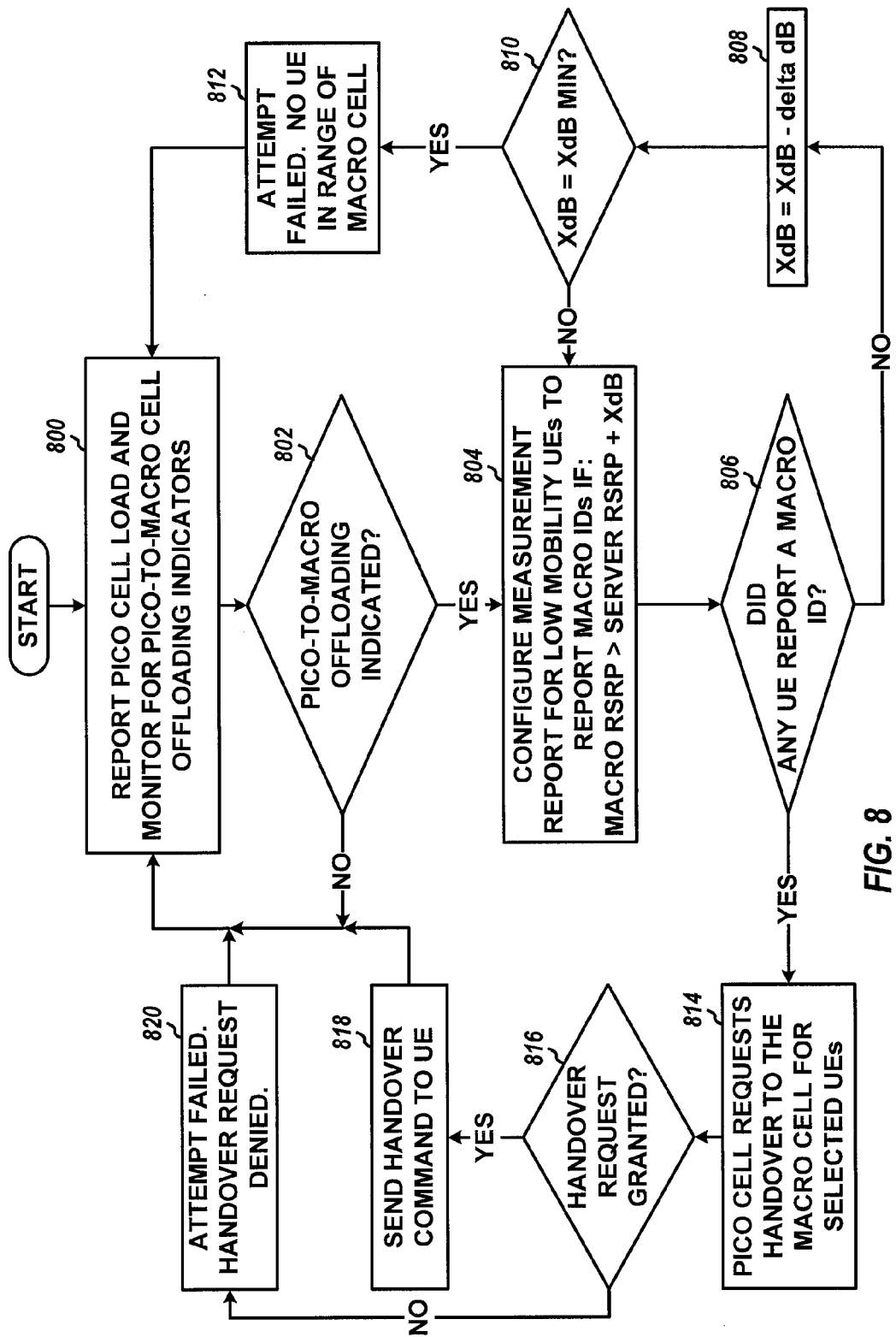
FIG. 8 is a functional block diagram conceptually illustrating example blocks executed by a pico-to-macro offloading algorithm at the pico cells to implement one aspect of the disclosure.

Turning now to FIG. 8, an example process carried out by a pico cell in accordance with the present disclosure may begin, at block 800, by reporting, to either the macro cell or the load balancing entity, pico cell loads, such as resource block utilization, subframe utilization, and/or number of Radio Resource Control (RRC) connections for the pico cell. Block 800 may also include monitoring for pico-to-macro cell offload indicators sent by the load balancing entity. Processing may proceed from block 800 to block 802.

At block 802, a determination may be made whether pico-to-macro load balancing is indicated, such as by receipt of a pico-to-macro load balancing indicator. In response to a determination, at block 802, that pico-to-macro load balancing is indicated, processing may proceed to block 804. Otherwise, processing may return to block 800.

At block 804, measurement reports may be configured for low mobility UEs to report a macro identity (ID) if macro radio signal receive power (RSRP) exceeds server RSRP after upward adjustment of the server RSRP by a pico CIO (XdB) according to:

$$\text{Macro RSRP>Server RSRP+XdB} \qquad (6)$$

Processing may proceed from block 804 to block 806. One skilled in the art will readily recognize equivalent evaluative procedures, such as replacing the upward adjustment of the server RSRP with a downward adjustment of the macro RSRP, or evaluating a result of a comparison of the server and macro RSRPs with respect to the XdB threshold.

At block 806, a determination may be made whether any UEs reported a macro ID. It should be understood that UEs that report the macro ID are considered in range of the macro cell, while those that are considered out of range of the macro cell will not report the macro ID. However, it may be the case that one or more of the UEs might be considered in range of the macro cell if the cell range of the pico cell were reduced. In response to a determination, at block 806, that no UE reported a macro ID, processing may proceed to block 808. Otherwise, processing may proceed to block 814.

At block 808, the pico CIO, XdB, may be downwardly adjusted by an incremental amount (delta dB) according to:

$$XdB=XdB-\text{delta dB} \qquad (7)$$

Decreasing the pico CIO in this fashion effects incremental reduction of the pico cell range. Processing may proceed from block 808 to block 810.

At block 810, a determination may be made whether the pico CIO, XdB, equals a minimum value for the pico CIO (XdB MIN) according to:

$$XdB=XdB\ MIN \qquad (8)$$

If the returned result of the evaluation at block 810 is true, then processing may proceed to block 812. Otherwise, processing may return to block 804. One skilled in the art will readily recognize equivalent evaluative procedures, such as determining whether the pico CIO falls below a threshold.

At block 812, a notification may be sent, to the load balancing entity, that the attempt failed due to no UE being in range of the macro cell. This notification allows the load balancing entity to distinguish between a failure due to failed handover versus no UE being in range of the pico cell. The reported failure also enables the load balancing entity to avoid repeatedly attempting to handover from the same pico cell. Processing may return, from block 812, to another point in the process, such as block 800.

At block 814, the pico cell may request handover, to the macro cell, of one or more UEs selected from among the UEs reporting the macro cell ID. This selection may occur randomly, or it may preferentially target a UE, among the UEs reporting the macro cell ID, exhibiting a highest traffic load. Processing may proceed from block 814 to block 816.

A determination may be made, at block 816, whether the handover request was granted. This determination may include receiving a message in response to the handover request. In response to a determination, at block 816, that a handover request was granted, processing may proceed to block 818. Otherwise, processing may proceed to block 820.

At block 818, the pico cell may send a handover command to the UE. The macro cell may additionally report successful handover to the load balancing entity. Such reporting may enable the load balancing entity to more quickly proceed with further load balancing in the macro cluster. Processing may return from block 818 to block 800.

At block 820, the pico cell may send a notification, to the load balancing entity, that the attempt failed due to handover request denial. This notification allows the load balancing entity to distinguish between a failure due to failed handover versus no UE being in range of the pico cell. The reported failure also enables the load balancing entity to avoid repeatedly attempting to handover to the same pico cell. Processing may return from block 820 to block 800.

Figure 9:
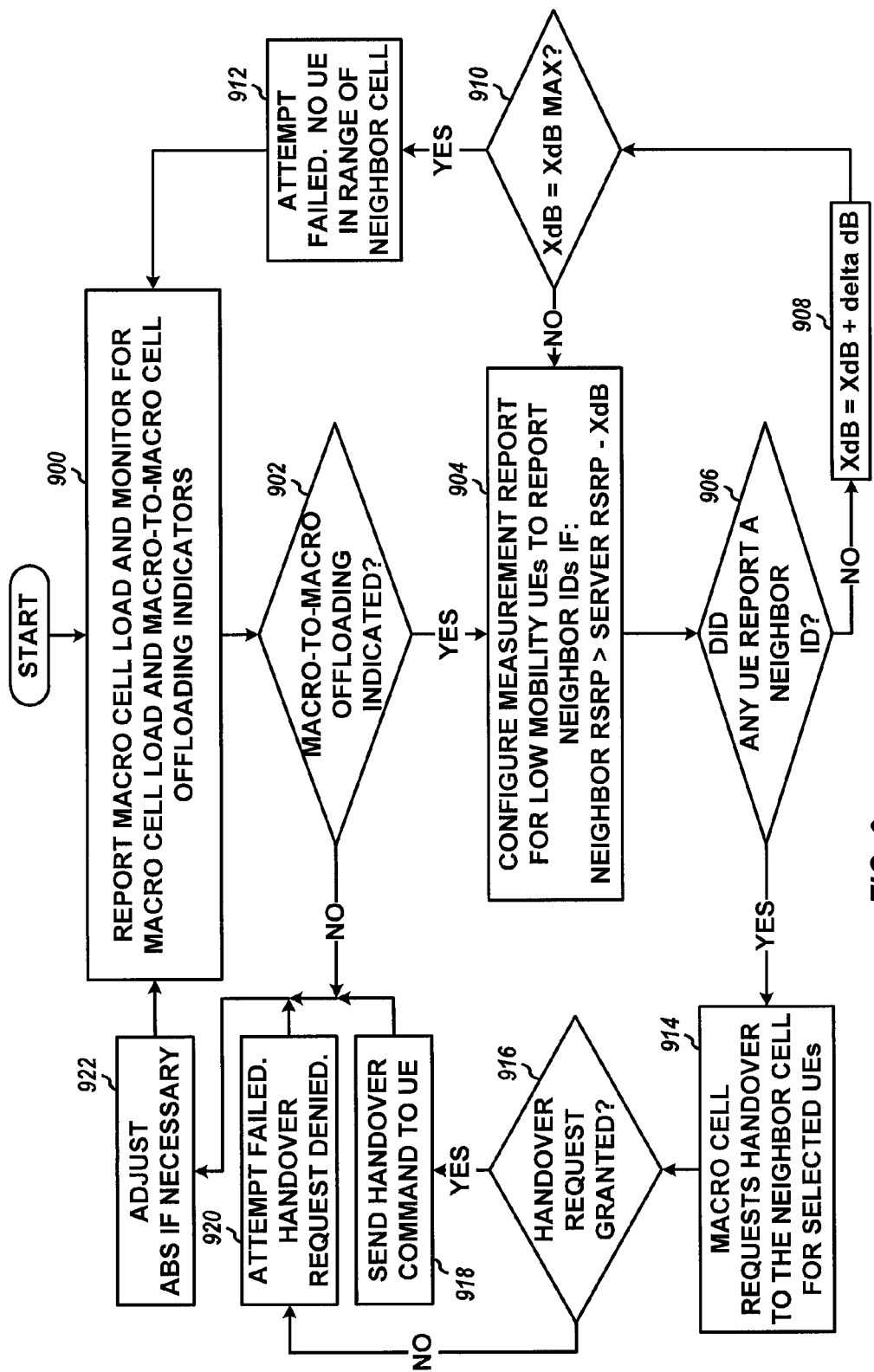
FIG. 9 is a functional block diagram conceptually illustrating example blocks executed by a macro-to-macro offloading algorithm at the macro cells to implement one aspect of the disclosure.

Turning now to FIG. 9, an example process carried out by a macro cell in accordance with the present disclosure may begin, at block 900, by reporting, to the load balancing entity, macro and/or pico cell loads, such as resource block utilization, subframe utilization, and/or number of Radio Resource Control (RRC) connections for the macro cell and each pico cell in the macro cluster. Block 900 may additionally include monitoring neighbor cell load. Block 900 may also include monitoring for macro-to-macro cell offload indicators sent by the load balancing entity. Processing may proceed from block 900 to block 902.

At block 902, a determination may be made whether macro-to-macro load balancing is indicated, such as by receipt of a macro-to-macro load balancing indicator that identifies a neighbor macro cell. In response to a determination, at block 902, that macro-to-macro load balancing is indicated, processing may proceed to block 904. Otherwise, processing may proceed to block 922.

At block 904, measurement reports may be configured for low mobility UEs to report neighbor macro identities (IDs) if neighbor macro radio signal receive power (RSRP) exceeds server RSRP after downward adjustment of the server RSRP by a neighbor macro CIO (XdB) according to:

$$\text{Neighbor RSRP} > \text{Server RSRP} - \text{XdB} \quad (9)$$

Processing may proceed from block 904 to block 906. One skilled in the art will readily recognize equivalent evaluative procedures, such as replacing the downward adjustment of the server RSRP with an upward adjustment of the neighbor RSRP, or evaluating a result of a comparison of the server and neighbor RSRPs with respect to the XdB threshold.

At block 906, a determination may be made whether any UEs reported the neighbor macro ID. It should be understood that UEs that report the neighbor macro ID are considered in range of the neighbor macro cell, while those that are considered out of range of the neighbor macro cell will not report the macro ID. However, it may be the case that one or more of the UEs might be considered in range of the neighbor macro cell if the cell range of the neighbor macro cell were increased. In response to a determination, at block 906, that no UE reported the neighbor macro ID, processing may proceed to block 908. Otherwise, processing may proceed to block 914.

At block 908, the neighbor macro CIO, XdB, may be upwardly adjusted by an incremental amount (delta dB) according to:

$$\text{XdB} = \text{XdB} + \text{delta dB} \quad (10)$$

Increasing the neighbor macro CIO in this fashion effects incremental expansion of the neighbor macro cell range. Processing may proceed from block 908 to block 910.

At block 910, a determination may be made whether the neighbor macro CIO, XdB, equals a maximum value for the macro CIO (XdB MIM) according to:

$$\text{XdB} = \text{XdB MAX} \quad (11)$$

If the returned result of the evaluation at block 910 is true, then processing may proceed to block 912. Otherwise, processing may proceed to block 904. One skilled in the art will readily recognize equivalent evaluative procedures, such as determining whether the neighbor macro CIO exceeds a threshold.

At block 912, a notification may be sent, to the load balancing entity, that the attempt failed due to no UE being in range of the neighbor macro cell. This notification allows the load balancing entity to distinguish between a failure due to failed handover versus no UE being in range of the pico cell. The reported failure also enables the load balancing entity to avoid repeatedly attempting to handover to the same pico cell. Processing may return, from block 912, to another point in the process, such as block 900.

At block 914, the macro cell may request handover, to the neighbor macro cell, of one or more UEs selected from among the UEs reporting the neighbor macro cell ID. This selection may occur randomly, or it may preferentially target a UE, among the UEs reporting the neighbor macro cell ID, exhibiting a highest traffic load. Processing may proceed to block 916 from block 914.

At block 916, a determination may be made whether the handover request was granted. This determination may include receiving a message in response to the handover request. In response to a determination, at block 916, that a handover request was granted, processing may proceed to block 918. Otherwise, processing may proceed to block 920.

At block 918, the macro cell may send a handover command to the UE. The macro cell may additionally report successful handover to the load balancing entity. Such reporting may enable the load balancing entity to more quickly proceed with further load balancing of the macro clusters. Processing may proceed to block 922 from block 918.

At block 920, the macro cell may send a notification, to the load balancing entity, that the attempt failed due to handover request denial. This notification allows the load balancing entity to distinguish between a failure due to failed handover versus no UE being in range of the pico cell. The reported failure also enables the load balancing entity to avoid repeatedly attempting to handover to the same pico cell. Processing may proceed from block 920 to block 922.

At block 922, ABS may be adjusted, if necessary. The ABS adjustment is a load balancing technique that may be used as a supplement to the load balancing techniques of the present disclosure. One skilled in the art will readily recognize and understand how to determine whether ABS adjustment is necessary, and how to adjust the ABS. Processing may return, from block 922, to a previous point in the process, such as block 900.

Figure 10:
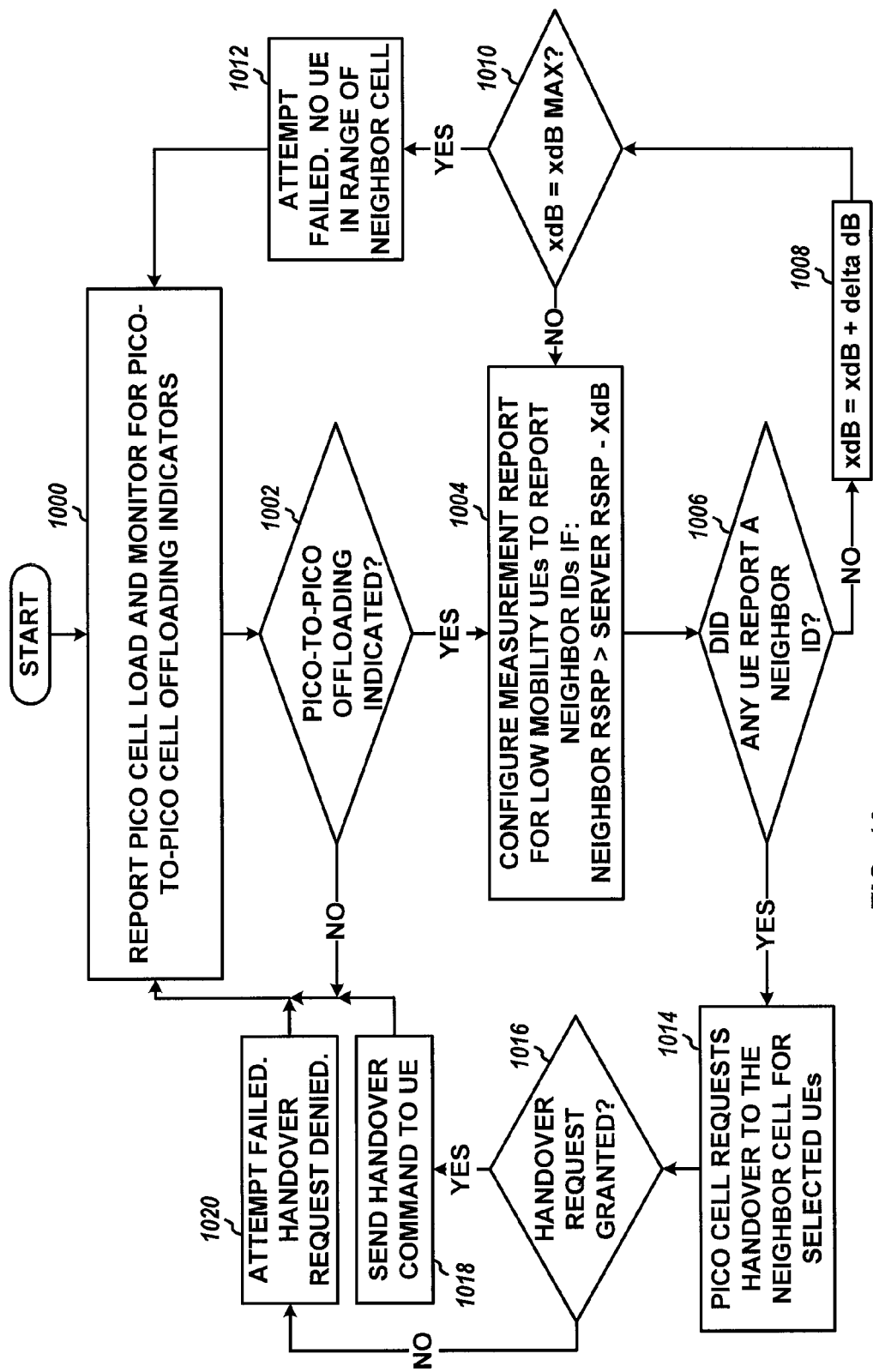
FIG. 10 is a functional block diagram conceptually illustrating example blocks executed by the pico-to-pico offloading algorithm at the pico cells to implement one aspect of the disclosure.

Turning now to FIG. 10, an example process carried out by a pico cell in accordance with the present disclosure may begin, at block 1000, by reporting, to either the macro cell or the load balancing entity, pico cell loads, such as resource block utilization, subframe utilization, and/or number of Radio Resource Control (RRC) connections for the pico cell. Block 1000 may also include monitoring for pico-to-pico cell offload indicators sent by the load balancing entity. Processing may proceed from block 1000 to block 1002.

At block 1002, a determination may be made whether pico-to-pico load balancing is indicated, such as by receipt of a pico-to-pico load balancing indicator that identifies a neighbor pico cell. In response to a determination, at block 1002, that pico-to-pico load balancing is indicated, processing may proceed to block 1004. Otherwise, processing may return to block 1000.

At block 1004, measurement reports may be configured for low mobility UEs to report a neighbor pico identity (ID) if neighbor pico radio signal receive power (RSRP) exceeds server RSRP after downward adjustment of the server RSRP by a neighbor pico CIO (XdB) according to:

$$\text{Neighbor RSRP} > \text{Server RSRP} - \text{XdB} \tag{12}$$

Processing may proceed from block 1004 to block 1006. One skilled in the art will readily recognize equivalent evaluative procedures, such as replacing the downward adjustment of the server RSRP with an upward adjustment of the neighbor RSRP, or evaluating a result of a comparison of the server and neighbor RSRPs with respect to the XdB threshold.

At block 1006, a determination may be made whether any UEs reported a neighbor pico ID. It should be understood that UEs that report the neighbor pico ID are in range of the neighbor pico cell, while those that are out of range of the neighbor pico cell will not report the neighbor pico ID. In response to a determination, at block 1006, that no UE reported a neighbor pico ID, processing may proceed to block 1008. Otherwise, processing may proceed to block 1014.

At block 1008, the neighbor pico CIO, XdB, may be upwardly adjusted by an incremental amount (delta dB) according to:

$$\text{XdB} = \text{XdB} + \text{delta dB} \tag{13}$$

Increasing the neighbor pico CIO in this fashion effects incremental expansion of the neighbor pico cell range. Processing may proceed from block 1008 to block 1010.

At block 1010, a determination may be made whether the pico CIO, XdB, equals a maximum value for the pico CIO (XdB MAX) according to:

$$\text{XdB} = \text{XdB MAX} \tag{14}$$

In response to a determination, at block 1010, that the minimum value for the pico CIO has been reached, processing may proceed to block 1012. Otherwise, processing may return to block 1004. One skilled in the art will readily recognize equivalent evaluative procedures, such as determining whether the neighbor pico CIO exceeds a threshold.

At block 1012, a notification may be sent, to the load balancing entity, that the attempt failed due to no UE being in range of the neighbor pico cell. This notification allows the load balancing entity to distinguish between a failure due to failed handover versus no UE being in range of the neighbor pico cell. The reported failure also enables the load balancing entity to avoid repeatedly attempting to handover to the same neighbor pico cell. Processing may return, from block 1012, to another point in the process, such as block 1000.

At block 1014, the pico cell may request handover, to the neighbor pico cell, of one or more UEs selected from among the UEs reporting the neighbor pico cell ID. This selection may occur randomly, or it may preferentially target a UE, among the UEs reporting the neighbor pico cell ID, exhibiting a highest traffic load. Processing may proceed from block 1014 to block 1016.

A determination may be made, at block 1016, whether the handover request was granted. This determination may include receiving a message in response to the handover request. In response to a determination, at block 1016, that a handover request was granted, processing may proceed to block 1018. Otherwise, processing may proceed to block 1020.

At block 1018, the pico cell may send a handover command to the UE. The macro cell may additionally report successful handover to the load balancing entity. Such reporting may enable the load balancing entity to more quickly proceed with further load balancing in the macro cluster. Processing may return from block 1018 to block 1000.

At block 1020, the pico cell may send a notification, to the load balancing entity, that the attempt failed due to handover request denial. This notification allows the load balancing entity to distinguish between a failure due to failed handover versus no UE being in range of the pico cell. The reported failure also enables the load balancing entity to avoid repeatedly attempting to handover to the same pico cell. Processing may return to block 1000 from block 1020.

Figures 11, 12:
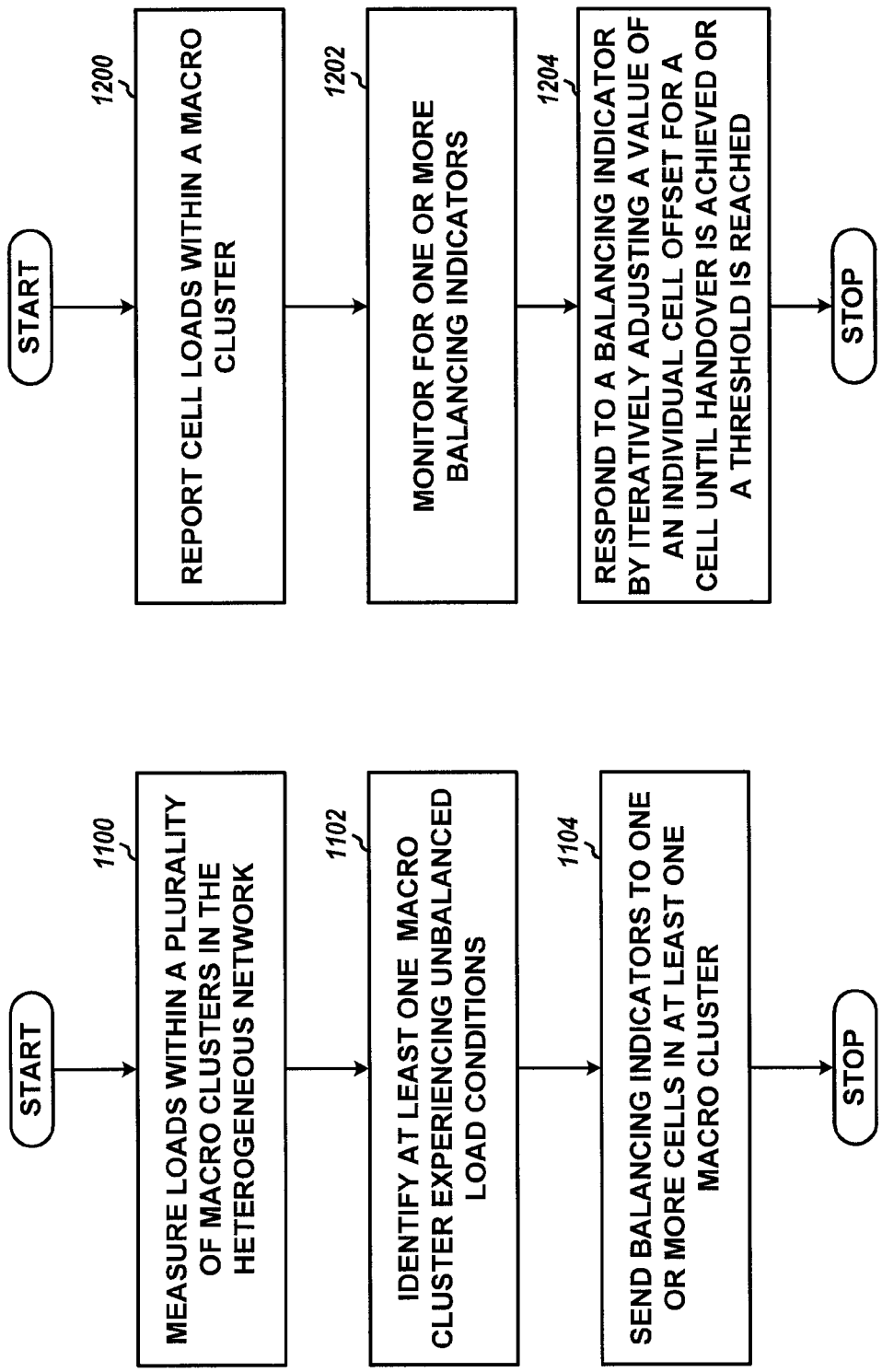
FIG. 11 is a functional block diagram conceptually illustrating example blocks executed to implement a process for carrying out load balancing between cells in a heterogeneous network.
FIG. 12 is a functional block diagram conceptually illustrating example blocks executed to implement a process for carrying out load balancing in a heterogeneous network.

FIG. 11 depicts example blocks executed to implement a process for carrying out load balancing between cells in a heterogeneous network. At block 1100, loads are measured within a plurality of macro clusters in the heterogeneous network. For example, SON functionality within the network entities, such as eNB 110 (FIG. 3), or, with reference to FIG. 4, HetNet load balancing entity 412, which may be a separate entity or a virtual entity made up of multiple individual network entities, one of which may also be eNB 110, measures the loads of various macro and pico cells with multiple macro clusters. For example, eNB 110, either executing SON functionality or as part of a HetNet load balancing entity 412, or a separate HetNet load balancing entity 412 receives transmissions from various macro and pico cells within the multiple macro clusters via antennas 334a-t, modulators/demodulators 332a-t, MIMO detector 336, and receive processor 338. Processing proceeds from block 1100 to block 1102. The combination of such acts and components may comprise means for measuring loads within a plurality of macro clusters in the heterogeneous network.

At block 1102, at least one macro cluster is identified that is experiencing unbalanced load conditions. With reference to the example of eNB 110 and HetNet load balancing entity 412, with the load reports received from the various macro and pico cells of the multiple macro clusters, comparisons are performed, under control of controller/processor 340 to identify the macro clusters that may be experiencing unbalanced load conditions. Controller/processor 340 would execute code stored in memory 342 to perform the determinations, such as indicated in Equation (1), whether comparing loads from macro-to-macro, macro-to-pico, pico-to-pico, or pico-to-macro. Processing proceeds from block 1102 to block 1104. The combination of such acts and components may comprise means for identifying at least one macro cluster experiencing unbalanced load conditions.

At block 1104, balancing indicators are sent to one or more cells in at least one macro cluster. With reference to the example of eNB 110 and HetNet load balancing entity 412, based on the determination of an unbalanced load condition, eNB 110 or HetNet load balancing entity 412 would generate and transmit, under control of controller/processor 340, a balancing indicator to one or more cells in a corresponding macro cluster. The balancing indicator would be processed by transmit processor 320, TX MIMO processor 330, and modulator/demodulators 332*a-t*, and transmitted over antennas 334*a-t* to the cells. The combination of such acts and components may comprise means for sending balancing indicators to one or more cells in the at least one macro cluster.

FIG. 12 depicts example blocks executed to implement a process for carrying out load balancing in a heterogeneous network. At block 1200, cell loads within a macro cluster are reported. The cells within a macro cluster may include one or more macro or pico cells. FIG. 3 illustrates eNB 110 as representing either a macro or pico eNB. Accordingly, eNB 110, in operation of block 1200, would monitor its load, under control of controller/processor 340, and transmit a cell load indication to either an entity performing SON functionality or a separate entity, such as HetNet load balancing entity 412. ENB 110 transmits the cell load indication using transmit processor 320, TX MIMO processor 330, and modulator/demodulators 332*a-t*, and antennas 334*a-t*. Processing proceeds from block 1200 to block 1202. The combination of such acts and components may comprise means for reporting cell loads within a macro cluster.

At block 1202, monitoring is performed for one or more load balancing indicators. With reference to the example cell, eNB 110, eNB 110 receives transmissions from various macro and pico cells within the multiple macro clusters via antennas 334*a-t*, modulators/demodulators 332*a-t*, MIMO detector 336, and receive processor 338. Controller/processor 340 monitors the received transmissions to detect for such load balancing indicators. Processing proceeds from block 1202 to block 1204. The combination of such acts and components may comprise means for monitoring for one or more balancing indicators.

At block 1204, a response is made to a balancing indicator by iteratively adjusting a value of an individual cell offset for a cell until at least one of: handover, to or from the cell, of one or more low mobility UE can be accomplished; or a determination is made that the value of the individual cell offset has reached at least one threshold prohibiting further adjustment. With reference to the example cell, eNB 110, controller/processor 340 may execute code stored in memory 342 to perform the functionalities described in, for example, FIG. 7, at blocks 704-718 including, for example, processing of Equations (3)-(5). The combination of such acts and components may comprise means for responding to a balancing indicator by iteratively adjusting a value of an individual cell offset for a cell until at least a handover, to or from the cell, of one or more low mobility UE can be accomplished or a determination is made that the value of the individual cell offset has reached at least one threshold prohibiting further adjustment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for carrying out load balancing between cells in a heterogeneous network, comprising:
    identifying at least one macro cluster experiencing unbalanced load conditions;
    determining, based on the identifying the at least one macro cluster experiencing unbalanced load conditions, to offload at least one user equipment from a macro cell of the at least one macro cluster to a pico cell of the at least one macro cluster;
    determining that offloading to the pico cell was previously attempted within a predefined time window;
    identifying another pico cell of the at least one macro cluster for which offloading was not attempted within the predefined time window;
    setting a macro-to-pico offload indicator for the macro cell and the another pico cell, the macro-to-pico offload indicator being a trigger for a handover from the macro cell to the another pico cell; and
    sending balancing indicators to one or more cells in the at least one macro cluster, wherein the balancing indicators include the macro-to-pico offload indicator.

2. The method of claim 1, wherein the identifying at least one macro cluster experiencing unbalanced load conditions is based on reports of resource block utilization, subframe utilization, or a number of Radio Resource Control (RRC) connections.

3. The method of claim 1, wherein identifying the at least one macro cluster experiencing unbalanced loading conditions comprises:
    identifying a load of at least one macro cell of the at least one macro cluster;
    sorting load values of pico cells of the at least one macro cluster in ascendant order of loading levels;
    comparing the load of the at least one macro cell and a load of a pico cell of the at least one macro cluster having a lowest load.

4. The method of claim 1, further comprising:
    determining whether there exists a loading imbalance across macro cells; and
    sending macro-to-macro offload indicators to one or more of the macro cells when the loading imbalance exists across the macro cells.

5. The method of claim 4, further comprising:
    determining whether there exists a loading imbalance across pico cells; and
    sending pico-to-pico offload indicators to one or more of the macro cells when the loading imbalance exists across the pico cells.

6. A method for carrying out load balancing between cells in a heterogeneous network, comprising:
    identifying at least one macro cluster experiencing unbalanced load conditions;
    determining, based on the identifying the at least one macro cluster experiencing unbalanced load conditions, to offload at least one user equipment onto at least one macro cell from a pico cell of the at least one macro cluster;
    determining that offloading from the pico cell was previously attempted within a predefined time window;
    selecting another pico cell of the at least one macro cluster to offload at least one user equipment onto the at least one macro cell from the another pico cell; and
    setting a pico-to-macro offload indicator for the at least one macro cell and the another pico cell, the pico-to-macro offload indicator being a trigger for a handover from the another pico cell to the at least one macro cell; and
    sending balancing indicators to one or more cells in the at least one macro cluster, wherein the balancing indicators include the pico-to-macro offload indicator.

7. A computer program product, comprising:
    a non-transitory computer-readable medium including:
        code for identifying at least one macro cluster experiencing unbalanced load conditions;
        code for determining, based on the identifying the at least one macro cluster experiencing unbalanced load conditions, to offload at least one user equipment from a macro cell of the at least one macro cluster to a pico cell of the at least one macro cluster;
        code for determining that offloading to the pico cell was previously attempted within a predefined time window;
        code for identifying another pico cell of the at least one macro cluster for which offloading was not attempted within the predefined time window;
        code for setting a macro-to-pico offload indicator for the macro cell and the another pico cell, the macro-to-pico offload indicator being a trigger for a handover from the macro cell to the another pico cell; and
        code for sending balancing indicators to one or more cells in the at least one macro cluster, wherein the balancing indicators include the macro-to-pico offload indicator.

8. A network component of a heterogeneous network, the network component comprising:
    at least one processor; and
    a memory coupled to said at least one processor,
    wherein said at least one processor is configured to:
        identify at least one macro cluster experiencing unbalanced load conditions;
        determine, based on the identification of the at least one macro cluster experiencing unbalanced load conditions, to offload at least one user equipment from a macro cell of the at least one macro cluster to a pico cell of the at least one macro cluster;
        determine that offloading to the pico cell was previously attempted within a predefined time window;
        identify another pico cell of the at least one macro cluster for which offloading was not attempted within the predefined time window;
        set a macro-to-pico offload indicator for the macro cell and the another pico cell, the macro-to-pico offload indicator being a trigger for a handover from the macro cell to the another pico cell; and
        send balancing indicators to one or more cells in the at least one macro cluster, wherein the balancing indicators include the macro-to-pico offload indicator.

9. The network component of claim 8, wherein said at least one processor is configured to identify the at least one macro cluster experiencing unbalanced loading conditions based on reports of at least one of: resource block utilization, subframe utilization, or a number of Radio Resource Control (RRC) connections.

10. The network component of claim 8, wherein said at least one processor is configured to identify the at least one macro cluster experiencing unbalanced loading conditions by:
  identifying a load of at least one macro cell of the at least one macro cluster;
  sorting load values of pico cells of the at least one macro cluster in ascendant order of loading levels;
  comparing the load of the at least one macro cell and a load of a pico cell of the at least one macro cluster having a lowest load.

11. The network component of claim 8, wherein said at least one processor is configured to:
  determine whether there exists a loading imbalance across macro cells; and
  send macro-to-macro offload indicators to one or more of the macro cells when the loading imbalance exists across the macro cells.

12. The network component of claim 11, wherein said at least one processor is configured to:
  determine whether there exists a loading imbalance across pico cells; and
  send pico-to-pico offload indicators to one or more of the macro cells when the loading imbalance exists across the pico cells.

13. A network component of a heterogeneous network, the network component comprising:
  at least one processor; and
  a memory coupled to said at least one processor,
  wherein said at least one processor is configured to:
    identify at least one macro cluster experiencing unbalanced load conditions;
    determine, based on the identifying the at least one macro cluster experiencing unbalanced load conditions, to offload at least one user equipment onto at least one macro cell from a pico cell of the at least one macro cluster;
    determine that offloading from the pico cell was previously attempted within a predefined time window;
    select another pico cell of the at least one macro cluster to offload at least one user equipment onto the at least one macro cell from the another pico cell; and
    set a pico-to-macro offload indicator for the at least one macro cell and the another pico cell, the pico-to-macro offload indicator being a trigger for a handover from the another pico cell to the at least one macro cell; and
    send balancing indicators to one or more cells in the at least one macro cluster, wherein the balancing indicators include the pico-to-macro offload indicator.

14. A computer program product, comprising:
a non-transitory computer-readable medium including:
  code for identifying at least one macro cluster experiencing unbalanced load conditions;
  code for determining, based on the identifying the at least one macro cluster experiencing unbalanced load conditions, to offload at least one user equipment onto at least one macro cell from a pico cell of the at least one macro cluster;
  code for determining that offloading from the pico cell was previously attempted within a predefined time window;
  code for selecting another pico cell of the at least one macro cluster to offload at least one user equipment onto the at least one macro cell from the another pico cell; and
  code for setting a pico-to-macro offload indicator for the at least one macro cell and the another pico cell, the pico-to-macro offload indicator being a trigger for a handover from the another pico cell to the at least one macro cell; and
  code for sending balancing indicators to one or more cells in the at least one macro cluster, wherein the balancing indicators include the pico-to-macro offload indicator.

* * * * *